(12) United States Patent
Li et al.

(10) Patent No.: US 9,310,964 B2
(45) Date of Patent: Apr. 12, 2016

(54) ICON GENERATION METHOD

(75) Inventors: Weixing Li, Beijing (CN); Tian Ren, Beijing (CN); Wanqiang Li, Beijing (CN); Jiangji Huang, Beijing (CN)

(73) Assignee: Xiaomi Inc., Haidian District, Beijing (CN)

(*) Notice: Subject to any disclaimer, the term of this patent is extended or adjusted under 35 U.S.C. 154(b) by 64 days.

(21) Appl. No.: 14/005,216

(22) PCT Filed: Mar. 13, 2012

(86) PCT No.: PCT/CN2012/072283
§ 371 (c)(1),
(2), (4) Date: Sep. 13, 2013

(87) PCT Pub. No.: WO2012/122933
PCT Pub. Date: Sep. 20, 2012

(65) Prior Publication Data
US 2014/0002506 A1 Jan. 2, 2014
US 2014/0210862 A9 Jul. 31, 2014

(30) Foreign Application Priority Data
Mar. 14, 2011 (CN) .......................... 2011 1 0060343

(51) Int. Cl.
*G06F 3/0481* (2013.01)
*G09G 5/00* (2006.01)
(Continued)

(52) U.S. Cl.
CPC .............. *G06F 3/04817* (2013.01); *G06F 8/38* (2013.01); *G06T 11/00* (2013.01); *G06T 11/001* (2013.01)

(58) Field of Classification Search
CPC ....... G06F 3/04817; G06F 8/38; G06T 11/00; G06T 11/001
See application file for complete search history.

(56) References Cited

U.S. PATENT DOCUMENTS 6,400,467 B1 * 6/2002 Harrington .................... 358/1.9
6,483,940 B1 * 11/2002 Wang ............................ 382/164
(Continued)

FOREIGN PATENT DOCUMENTS

CN 101312065 11/2008
CN 101393512 A 3/2009
(Continued)

OTHER PUBLICATIONS

PCT International Search Report (with English translation) and Written Opinion, PCT/CN2012/072283, Jun. 28, 2012, 7 Pages.
(Continued)

*Primary Examiner* — Sing-Wai Wu
(74) *Attorney, Agent, or Firm* — Fenwick & West LLP

(57) ABSTRACT

Disclosed is an icon generation method, comprising: adjusting an original icon to a preset size for a certain resolution environment; determining statistics for the color values of all pixels of the original icon and calculating a dominant hue of the original icon; generating a background color based on a hue angle of the dominant hue and preset values of color saturation and brightness; applying the background color to a preset color gradient template to generate an icon background; cutting the adjusted icon by using a preset icon edge cutting template; and combining the icon background, the cut icon, and a preset icon foreground template to generate a final icon. Through the disclosed solution, new icons complying with a unified system style can be generated, and content consistency of the new icons can be best ensured.

10 Claims, 1 Drawing Sheet

(51) Int. Cl.
*G06F 9/44* (2006.01)
*G06T 11/00* (2006.01)

(56) References Cited

U.S. PATENT DOCUMENTS

| | | |
|---|---|---|
| 7,573,487 B1 | 8/2009 | Petersen |
| 7,961,257 B2 | 6/2011 | Ogawa |
| 8,402,389 B2 | 3/2013 | Nagasaka et al. |
| 2007/0070468 A1* | 3/2007 | Ogawa .................... 358/518 |
| 2008/0043132 A1* | 2/2008 | Gunter .................... 348/333.01 |
| 2008/0295028 A1* | 11/2008 | Nagasaka et al. ............. 715/810 |
| 2008/0307341 A1 | 12/2008 | Ferry et al. |

FOREIGN PATENT DOCUMENTS

| | | |
|---|---|---|
| CN | 101916168 A | 12/2010 |
| JP | 64-007263 | 1/1989 |
| JP | 06-342352 | 12/1994 |
| JP | 10-240218 | 9/1998 |
| JP | 2002-024319 | 1/2002 |
| JP | 2002-166608 | 6/2002 |
| JP | 2003-195852 | 7/2003 |
| JP | 2006-195592 | 7/2006 |
| JP | 2007-293460 | 11/2007 |
| JP | 2007-299335 | 11/2007 |
| JP | 2008-287125 | 11/2008 |
| JP | 2010-061333 | 3/2010 |
| KR | 100650660 B1 | 11/2006 |
| WO | WO 2010/062619 | 6/2010 |

OTHER PUBLICATIONS

Anonymous, "How can I configure Unity?—Ask Ubuntu," Ubuntu, Mar. 8, 2011, XP055155562, 4 pages.
Can be Retrieved from the Internet: URL:http://askubuntu.com/questions/29553/how-can-i-configure-unity/29561#29561.
Anonymous, "11 10.10—How does Unity decide the icon background colours?—Ask Ubuntu," Ubuntu, Nov. 11, 2010, XP055155558, 1 Pages, Can be retrieved from the Internet: URL:http://askubuntu.com/questions/12743/how-does-unity-decide-the-icon-background-colours [retrieved on Nov. 27, 2014].
Gordon Allott: unity 0.2.10—icon-postprocessor_8c_source.html, Doxygen 1.8.0, Jan. 1, 2010, XP55155557, 18 Pages, Can be retrieved from the Internet: URL:http://www.sourcecodebrowser.com/unity/0.2.10/icon-postprocessor_8c_source.html.
Extended European Search Report for European Patent Application No. EP 12757848.2, Dec. 9, 2014, 6 Pages.
Decision of Granting Patent for Korean Patent Application No. KR 10-2013-7024146, Nov. 20, 2014, 7 pages.
Office Action for Korean Patent Application No. KR 10-2013-7024146, Jul. 7, 2014, 4 pages. (With Concise Explanation of Relevance).
Notice of Decision of Granting Patent for Japanese Patent Application No. JP 2013-556960, Mar. 3, 2015, 5 Pages. (With Concise Explanation of Relevance).
Notification of Reason for Refusal for Japanese Patent Application No. JP 2013-556960, Jul. 1, 2014, 3 Pages. (With Concise Explanation of Relevance).
Office Action for Chinese Patent Application No. CN 201110060343.3, May 9, 2013, 4 Pages. (With Concise Explanation of Relevance).
Office Action for Chinese Patent Application No. CN 201110060343.3, Nov. 26, 2013, 5 Pages. (With Concise Explanation of Relevance).
Rejection for Chinese Patent Application No. CN 201110060343.3, Mar. 5, 2014, 5 Pages. (With Concise Explanation of Relevance).
Examination Decision of the Patent Reexamination Board for Chinese Patent Application No. CN 201110060343.3, Nov. 3, 2015, 3 pages. (With Concise Explanation of Relevance).

\* cited by examiner

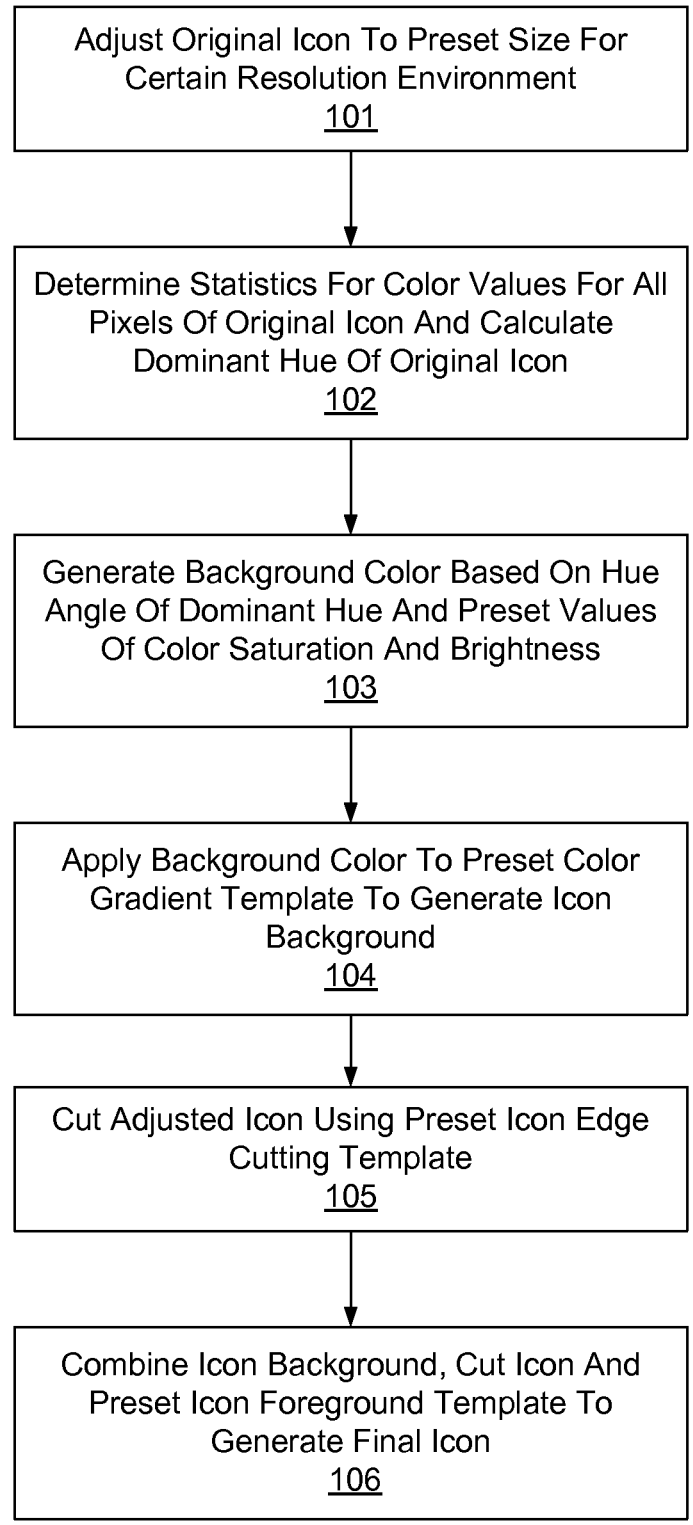

ICON GENERATION METHOD

CROSS-REFERENCE TO RELATED APPLICATION(S)

This application is the U.S. National Stage of International Application No. PCT/CN2012/072283, "Icon Generation Method," filed Mar. 13, 2012; which claims priority to CN application 201110060343.3, filed Mar. 14, 2011. The subject matter of all of the foregoing is incorporated herein by reference in their entirety.

FIELD OF ART

This disclosure generally relates to graphical user interface and, more particularly, to a method for icon generation.

BACKGROUND

Most operating systems for computers or smart phones support various applications developed by third parties to be used in these systems. Therefore, such operating systems must provide a solution enabling users to identify these third party applications.

In almost all operating systems with a graphical user interface, third party applications can be identified by specific graphics called icons, which are generally provided by the developers of the third party applications.

Since icons for the third party applications are provided by various developers, the icon styles are often inconsistent; so the list of application icons in the user interface looks disorderly, reducing the user's experience.

Currently, limited graphics are built into operating systems. In accordance with each third party application, some graphics are selected randomly and merged with the application icon in a certain way to generate a new icon, realizing global consistency in icon styles.

However, the graphics selected randomly by the operating system may not be related to the content of the third party applications icons, so the merged icons may not be aesthetically pleasing and the final generated icons do not provide any predictability for the developers of the third party applications.

SUMMARY

The present disclosure provides a method for icon generation, which generates new icons complying with a unified system style, and ensuring content consistency of the new icons.

To this end, the present disclosure adopts the following technical scheme:

A method for icon generation, comprising the following steps:
  A. adjusting an original icon to a preset size for a certain resolution environment;
  B. determining statistics for the color values of all pixels of the original icon and calculating a dominant hue of the original icon;
  C. generating a background color based on a hue angle of the dominant hue and preset values of color saturation and brightness;
  D. applying the background color to a preset color gradient template to generate an icon background;
  E. cutting the adjusted icon by using a preset icon edge cutting template;
  F. combining the icon background, the cut icon, and a preset icon foreground template to generate a final icon.

Step B comprises the following steps:
  obtaining RGB values for all pixels of the original icon;
  determining an average R value by averaging R values for all pixels of the original icon;
  determining an average G value by averaging G values for all pixels of the original icon;
  determining an average B value by averaging B values for all pixels of the original icon;
  the dominant hue of the original icon based on the average R, average G and average B values.

Through this technical scheme of the present disclosure, the content in icons of third party applications can be analyzed; and based on the content of the original icons, new icons complying with a unified system style could be generated, realizing consistency of a global icon style. Also, the new icon can be aesthetically pleasing while preserving the original content.

BRIEF DESCRIPTION OF THE FIGURES

FIG. 1 is a flowchart illustrating a method for icon generation according to an exemplary embodiment of the present disclosure.

DETAILED DESCRIPTION OF EXEMPLARY EMBODIMENTS

Embodiments of the present disclosure are further described in detail with reference to the accompanying FIGURE.

FIG. 1 is a flowchart illustrating a method for icon generation according to an exemplary embodiment of the present disclosure. As shown in FIG. 1, the method for icon generation comprises the following steps:

Step 101. Adjust an original icon to a preset size for a certain resolution environment.

Step 102. Determine statistics for the color values of all pixels of the original icon, and calculate a dominant hue of the original icon. Firstly, obtain RGB values for all pixels of the original icon; determine an average R value by averaging R values for all pixels of the original icon; determine an average G value by averaging G values for all pixels of the original icon; determine an average B value by averaging B values for all pixels of the original icon; the dominant hue of the original icon based on the average R, average G and average B values.

Step 103. Generate a background color based on a hue angle of the dominant hue and preset values of color saturation and brightness.

Step 104. Apply the background color to a preset color gradient template to generate an icon background.

Step 105. Cut the adjusted icon from Step 101 using a preset icon edge cutting template.

Step 106. Combine the icon background, the cut icon, and a preset icon foreground template to generate a final icon.

The above is a detailed description of the technical features of the present disclosure based on a typical preferred embodiment. However, it should be appreciated that the present disclosure is capable of a variety of embodiments and various modifications by those skilled in the art, and all such variations or changes shall be embraced within the scope of the following claims.

The invention claimed is:
1. A method for icon generation, comprising:
  adjusting an original icon to a preset size for a certain resolution environment;

determining statistics for the color values of all pixels of the original icon and calculating a dominant hue of the original icon;

generating a background color based on a hue angle of the dominant hue and preset values of color saturation and brightness;

applying the background color to a preset color gradient template to generate an icon background;

cutting the adjusted icon by using a preset icon edge cutting template;

analyzing content of the original icon; and combining the icon background, the cut icon, and a preset icon foreground template to generate a final icon, wherein the final icon is consistent with a preset global icon style while preserving the content of the original icon.

2. The method of claim 1, wherein determining statistics for the color values of all pixels of the original icon comprises:

obtaining RGB values for all pixels of the original icon;

determining an average R value by averaging R values for all pixels of the original icon;

determining an average G value by averaging G values for all pixels of the original icon;

determining an average B value by averaging B values for all pixels of the original icon; and calculating the dominant hue of the original icon based on the average R, average G and average B values.

3. The method of claim 1, wherein the preset size, the preset values of color saturation and brightness, the preset color gradient template, the preset icon edge cutting template, and the preset icon foreground template are all associated with the preset global icon style.

4. The method of claim 1, wherein the original icon is an icon provided for a third party application, the third party application to be used in an operating system having a graphical user interface, and the final icon is an icon used in the graphical user interface to identify the third party application.

5. The method of claim 4, wherein the original icon is provided by a developer of the third party application.

6. A method for generating icons to be used in a graphical user interface according to a global icon style, comprising:

receiving original icons for third party applications to be used in an operating system having a graphical user interface;

for each original icon:

cutting the original icon according to a resolution environment for the graphical user interface and further according to a preset icon edge cutting template;

generating an icon background based on statistics for the color values of all pixels of the original icon;

analyzing content of the original icon; and combining the icon background, the cut icon, and a preset icon foreground template to generate a final icon, wherein the final icon is consistent with the global icon style while preserving the content of the original icon;

wherein all such final icons comply with the global icon style.

7. The method of claim 6, wherein cutting the original icon comprises:

adjusting the original icon to a preset size for the resolution environment for the graphical user interface; and cutting the adjusted icon by using a preset icon edge cutting template.

8. The method of claim 6, wherein generating an icon background comprises:

determining statistics for the color values of all pixels of the original icon and calculating a dominant hue of the original icon;

generating a background color based on a hue angle of the dominant hue and preset values of color saturation and brightness; and applying the background color to a preset color gradient template to generate an icon background.

9. The method of claim 8, wherein determining statistics and calculating a dominant hue comprises:

obtaining RGB values for all pixels of the original icon;

determining an average R value by averaging R values for all pixels of the original icon;

determining an average G value by averaging G values for all pixels of the original icon;

determining an average B value by averaging B values for all pixels of the original icon; and calculating the dominant hue of the original icon based on the average R, average G and average B values.

10. The method of claim 6, wherein the original icons are provided by developers of the third party application.

* * * * *